(12) United States Patent
Peters (10) Patent No.: US 8,474,478 B2
(45) Date of Patent: Jul. 2, 2013

(54) FLOAT VALVE

(76) Inventor: William H. Peters, West Unity, OH (US)

( * ) Notice: Subject to any disclaimer, the term of this patent is extended or adjusted under 35 U.S.C. 154(b) by 0 days.

(21) Appl. No.: 13/374,943

(22) Filed: Jan. 24, 2012

(65) Prior Publication Data

US 2013/0019962 A1    Jan. 24, 2013

Related U.S. Application Data

(60) Provisional application No. 61/509,657, filed on Jul. 20, 2011.

(51) Int. Cl.
*F16K 31/18* (2006.01)
(52) U.S. Cl.
USPC .............. 137/445; 137/446; 137/448; 119/78
(58) Field of Classification Search
USPC ................ 119/73, 78–80; 137/427, 434, 445, 137/446, 448; 251/279, 280, 251
See application file for complete search history.

(56) References Cited

U.S. PATENT DOCUMENTS

| | | | | |
|---|---|---|---|---|
| 579,171 A * | 3/1897 | Noyes et al. | ................ | 137/445 |
| 1,918,128 A * | 7/1933 | Pfening et al. | ................ | 137/445 |
| 2,302,274 A * | 11/1942 | Svirsky | ................ | 137/445 |
| 3,040,769 A * | 6/1962 | Lamb | ................ | 137/445 |
| 4,064,895 A | 12/1977 | Borgen et al. | | |
| 4,274,365 A | 6/1981 | Peters | | |
| 5,836,022 A * | 11/1998 | Busenga | ................ | 4/508 |
| 6,571,605 B2 * | 6/2003 | Johnson | ................ | 73/38 |
| 6,938,461 B1 * | 9/2005 | Johnson | ................ | 73/38 |
| 6,966,334 B2 * | 11/2005 | Bolster | ................ | 137/434 |
| 7,481,238 B2 * | 1/2009 | Ramoth | ................ | 137/434 |
| 7,559,337 B2 * | 7/2009 | Han | ................ | 137/445 |
| 8,091,581 B2 * | 1/2012 | Buchtel | ................ | 137/448 |

* cited by examiner

*Primary Examiner* — Craig Schneider
*Assistant Examiner* — Craig J Price
(74) *Attorney, Agent, or Firm* — David C. Purdue (57) ABSTRACT

A float valve comprising a shut-off lever and a float lever is disclosed. The shut-off lever is supported for pivotal movement about a first axis between a first closed position and a second open position. The float lever is supported for pivotal movement about a second axis between a first closed position and a second open position. The float lever and the shut-off lever include cams which cooperate to transmit closing forces and opening forces between the levers. The valve exhibits a snap closing action whereby seeping is prevented over a substantial range of liquid levels.

18 Claims, 8 Drawing Sheets

FIG.9

FLOAT VALVE

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM LISTING APPENDIX

Not applicable.

BACKGROUND OF THE INVENTION

1. Field of the Invention

The invention relates to valves and relates particularly to float valves especially suited to maintaining the level of water in a tank, such as a stock watering tank, at or below a desired level.

2. Description of the State of the Art

Float valves are known and they are used in a wide variety of applications to keep the volume or quantity of a liquid in a container below a desired value or within a desired range of values. Float valves operate automatically to prevent the level of liquid in a tank from exceeding a maximum desired level by controlling the flow of liquid into the tank. A float valve has a valve that closes when the liquid level reaches an upper limit. As the liquid level falls, the valve opens and the flow of liquid into the tank is resumed and continues until the liquid level reaches the upper limit. The valve is opened and closed mechanically by the float and the position of the float determines when the valve will be open and when the valve will be closed and when the valve will be in an intermediate position. The position of the float depends upon the liquid level in the tank. When the liquid level reaches the upper limit, the float moves up and closes the valve. When the level of liquid in the tank falls, the float moves down and the valve opens. The position of the float depends, at least in part, upon the buoyancy of the float relative to the liquid.

U.S. Pat. No. 4,274,365 discloses an automatic watering device comprising a float valve. A float controlled valve assembly is described in U.S. Pat. No. 4,064,895. Myriad float valves are distributed through Tractor Supply Co. including those originating through Little Giant and Newell Rubbermaid. Manta-Ray, Inc. in West Unity Ohio manufactures and distributes many types of float valves.

Known livestock watering tank float valves operate so that the valve closes when the water level in the tank reaches a desired maximum level. When the valve is closed and the water level in the tank is being drawn down, as when livestock are drinking from the tank, the tank is draining and the level of the float will go down. If the float level continues to go down, eventually a point is reached where the valve will open, ever so slightly, and liquid will begin to flow through the valve into the tank. So long as the tank is draining, the level of the float will continue to go down. The float will stop going down when the tank stops draining or when the float reaches the limit of its downward travel. As the float valve goes down and the valve opens further, in some cases it reaches a full open position and the rate of flow of water through the valve into the tank will reach a maximum rate. Throughout this specification, the rate of flow of water through the valve into the tank will be referred to as the filling rate. The draining rate refers to the rate at which water is being drawn out of the tank, without taking into account the filling rate. Thus, when the filling rate is greater than the draining rate, the tank is filling and the water level is rising. When the draining rate is greater than the filling rate, the tank is draining and the water level is falling. When the two rates are equal, the tank is neither filling nor draining and the water level remains constant. Known float valves are described further, below.

If the tank is draining, the level of the float will go down. When the level of the float gets low enough, the valve will reach a full open position and the filling rate will be at a maximum. Even with the valve fully opened and the filling rate at the maximum, if the draining rate is greater than the filling rate, the tank will be draining. When the valve is open at all, and the tank is filling, the valve will be moving into the closed position and the filling rate will be getting lower and lower. A condition known as seeping occurs when the filling rate is very low. Seeping is a condition where the filling rate is so slow that the water may be said to be seeping into the tank. In a case where a pump supplies water to the valve for filling the tank, the seeping condition can lead to problems for the pump.

Pumps are set to maintain a line pressure between an upper setting and a lower setting. When the line pressure falls to the lower setting, the pump activates and runs until the line pressure reaches the upper setting and the pump shuts off. When the filling rate is very low, the pump will run only a short time during each cycle because the upper pressure setting is reached very quickly. In this situation, the pump will have to cycle very many times before the valve closes because the liquid level in the tank is rising so very slowly—water is only seeping into the tank. Each time that an electric pump starts, its power consumption spikes. Thus, an electric pump in a system that requires the pump to cycle very frequently, per gallon pumped, will use more energy than a pump in a system in which the pump is cycled less frequently, per gallon pumped. In addition, an electric pump can only start and stop so many times before it wears out. Thus, an electric pump in a system that requires the pump to cycle very frequently, per gallon pumped, will wear out faster than a pump in a system in which the pump is cycled less frequently, per gallon pumped.

It is an object of the invention to provide a durable and reliable float valve for maintaining a liquid level in a container at or below a high level mark.

It is a further object of the invention to provide such a valve that is especially suited for use with a stock water tank.

It is still another object of the invention to provide such a valve which can close, at least under some conditions, without seeping.

It is a further object of the invention to provide a float valve that will contribute to an associated pump using less energy.

It is a still further object of the invention to provide a float valve that will contribute to a longer life for an associated pump.

It is yet another object of this invention to provide such a valve which is especially suited for easy manufacturing and assembly.

These and other objects and advantages of the present invention shall be apparent from the following detailed description with reference, therein, to the several drawing figures.

DETAILED DESCRIPTION OF REPRESENTATIVE EMBODIMENTS OF THE INVENTION

Figure 1:
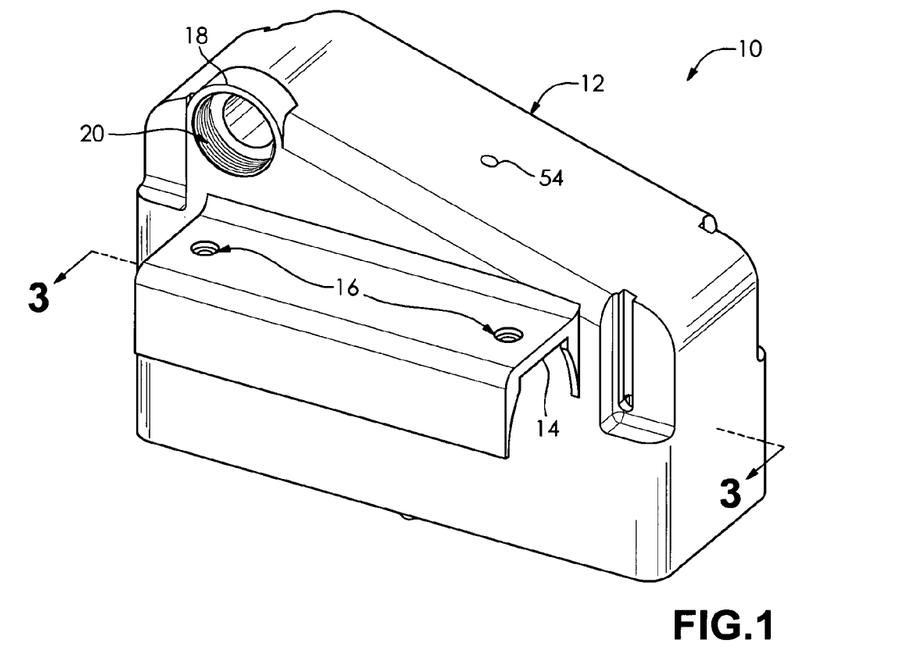
FIG. 1 is a left rear perspective view of a valve according to the invention.
Figure 2:
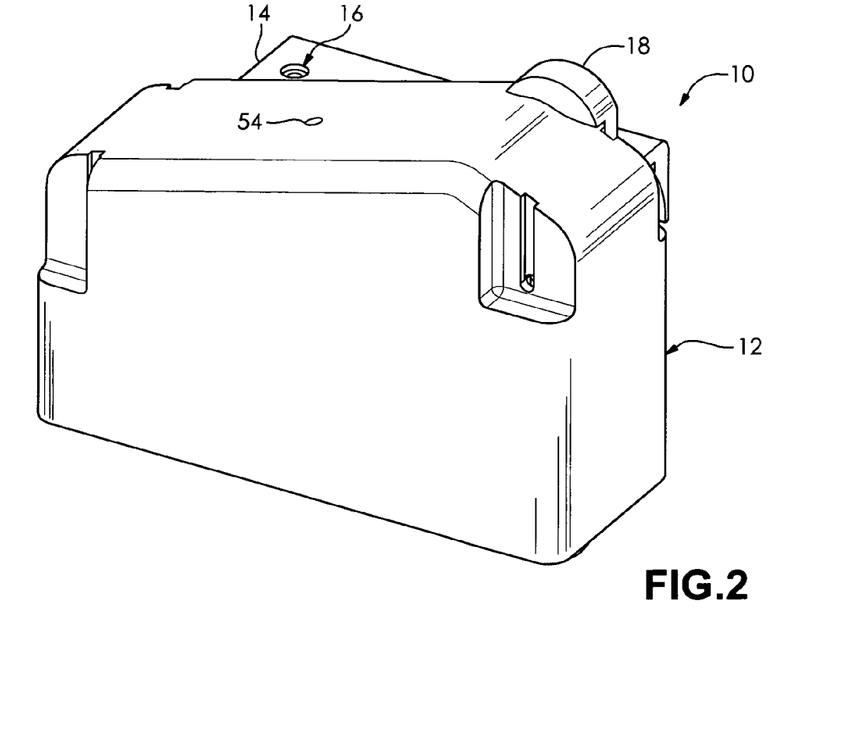
FIG. 2 is a right front perspective view of a valve according to the invention.

Referring now to FIGS. 1 and 2, a float valve indicated generally at 10 comprises a valve housing 12 which includes an integral mounting bracket 14 for supporting the valve 10 on a tank (not shown), for example, on the rail of a stock watering tank. Fastener openings indicated at 16 are provided on the mounting bracket 14 for securing the valve 10 to a tank, such as a stock watering tank. An integral water supply coupler 18 is internally threaded as indicated at 20 in FIG. 1. A water supply conduit (not shown) may be fluidically connected directly to the valve 10 through the coupler 18 or through an intermediate coupler (not shown). The supply coupler 18 is a water inlet through which water flows into the valve housing 12 when the valve 10 is open.

When the valve 10 is open, water admitted through the water inlet 18 and is directed to and through a water outlet which is illustrated in the form of an outlet nozzle 22. Water is discharged through an opening in the lower end 24 (FIGS. 7-9) of the water outlet 22 and is directed downwardly. When the valve 10 is closed, the flow of water out of the water outlet 22 is prevented.

Figure 3:
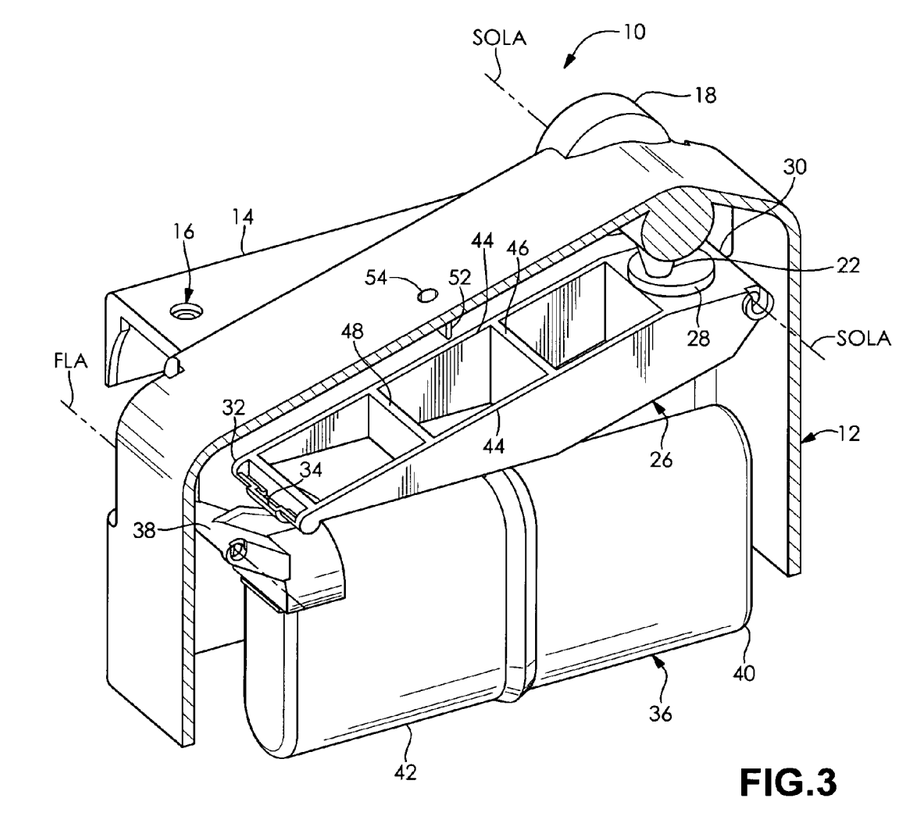
FIG. 3 is a left front perspective cross-sectioned view of a valve according to the invention taken along the line 3-3 of FIG. 1, with the valve in a no flow condition.
Figure 4:
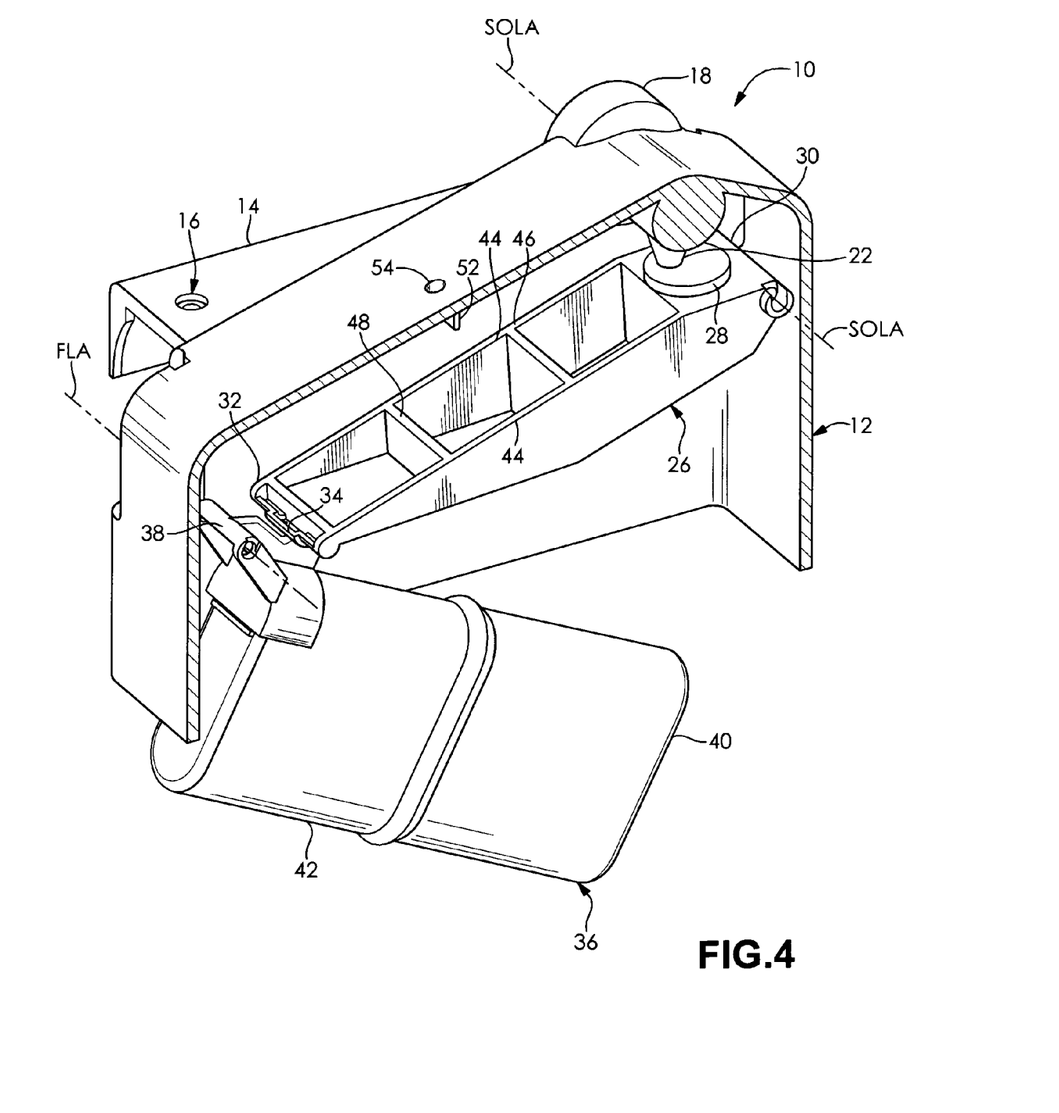
FIG. 4 is a left front perspective view of the valve shown in FIG. 4, with a portion of the valve housing cut-away and the valve in a full flow condition.

A shut-off lever 26 (FIGS. 3 and 4) is mounted within the housing 12 and is supported for pivotal movement about a shut-off lever axis SOLA between a first, closed position illustrated in FIG. 3 and a second, full open position illustrated in FIG. 4. A shut-off sealing pad 28 is supported on the shut-off lever 26, near a first end 30 of the shut-off lever, below the water outlet nozzle 22. When the shut-off lever 26 is in the first position, shown in FIG. 3, the shut-off pad 28 engages the opening in the lower end 24 of the outlet nozzle 22 so that the flow of water through the valve 10 and out of the water outlet 22 is prevented. Preferably, the shut-off pad 28 is resilient so as to better seal against the discharge end 24 of the outlet nozzle. When the shut-off lever 26 is in the second position, shown in FIG. 4, the shut-off pad 28 is removed from the discharge end 24 of the outlet nozzle 22 and the valve 10 is open and water flows through the valve 10 and out of the water outlet 22 and into the interior of the housing 12.

The shut-off lever 26 extends from its first end 30 to a second end 32. A cam member 34 is supported on the second end 32 of the shut-off lever 26. In a manner described more fully below, with reference to FIGS. 7-9, forces are transmitted through the cam member 34 while the valve 10 is operating.

The cam member 34 cooperates with a float lever 36 which is mounted within the housing 12. The float lever 36 is supported at its first end 38 for pivotal movement about a float lever axis FLA between a first, shut-off position illustrated in FIG. 3 and a second, fully open position illustrated in FIG. 4. When the float lever 36 pivots from the second position (FIG. 4) to the first position (FIG. 3), the force associated with the upward movement of the float lever 36 is transmitted through the cam member 34 as described below with reference to FIGS. 7-9. This force biases the shut-off lever 26 to pivot towards the first, closed position illustrated in FIG. 3.

The float lever 36 extends from its first end 38 to a second end 40 which is comprised of a float 42. The float 42 can be hollow enclosing a given volume of air or enclosing anything that makes the float 42 less dense than water or the liquid in the tank associated with the valve 10. When the level of water rises from a low water level to a high water level, the force associated with the buoyancy of the float 42 biases the float lever 36 to pivot towards the first position (FIG. 3).

Figure 5:
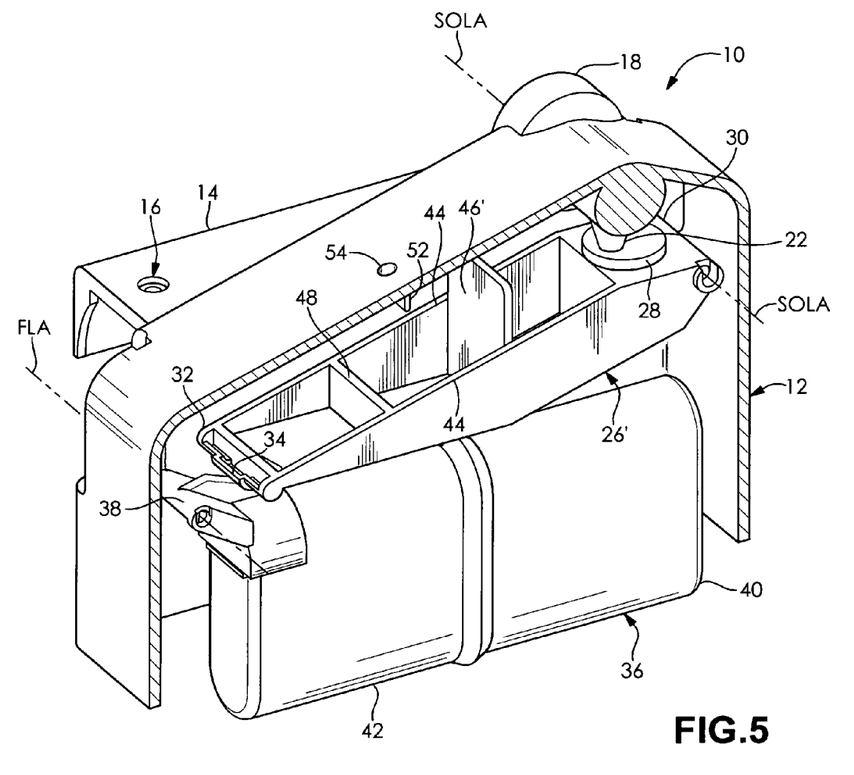
FIG. 5 is a left front perspective view, corresponding with FIG. 3, of a second embodiment of the valve shown in FIGS. 3 and 4, with the valve in a no flow condition.
Figure 6:
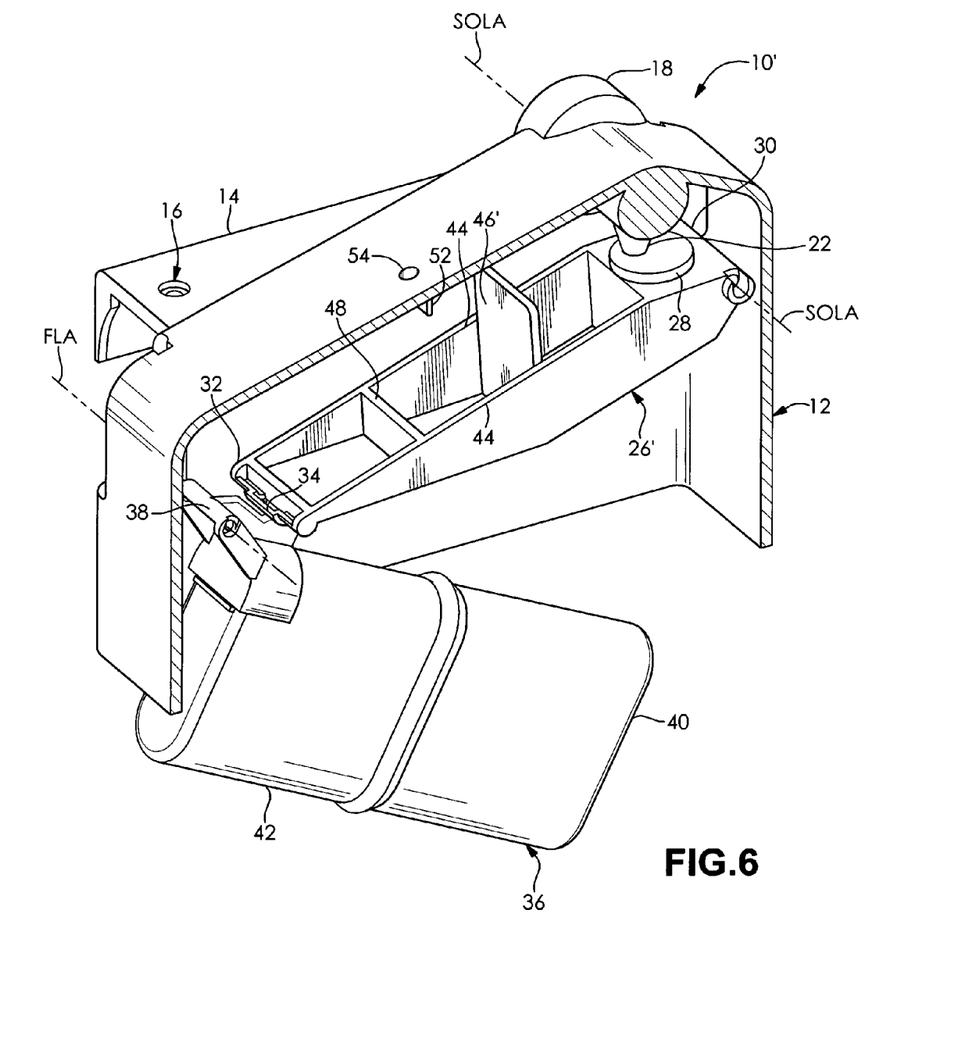
FIG. 6 is a left front perspective view of a the valve shown in FIG. 5 with the valve in a full flow condition.

The shut-off lever 26 comprises two longitudinally extending sides 44. A first laterally extending baffle 46 and a second laterally extending baffle 48 are supported between the sides 44. These baffles in the shut-off lever 26 provide the valve 10 with some interesting operating features which are discussed below with reference to FIGS. 7-9. Except for a modified shut-off lever 26', the valve 10' shown in FIGS. 5 and 6 corresponds, generally, with the valve 10 shown in FIGS. 3 and 4. The shut-off lever 26' has a first baffle 46' which extends upwardly beyond the longitudinally extending sides 44 of the shut-off lever 26'.

Figure 7:
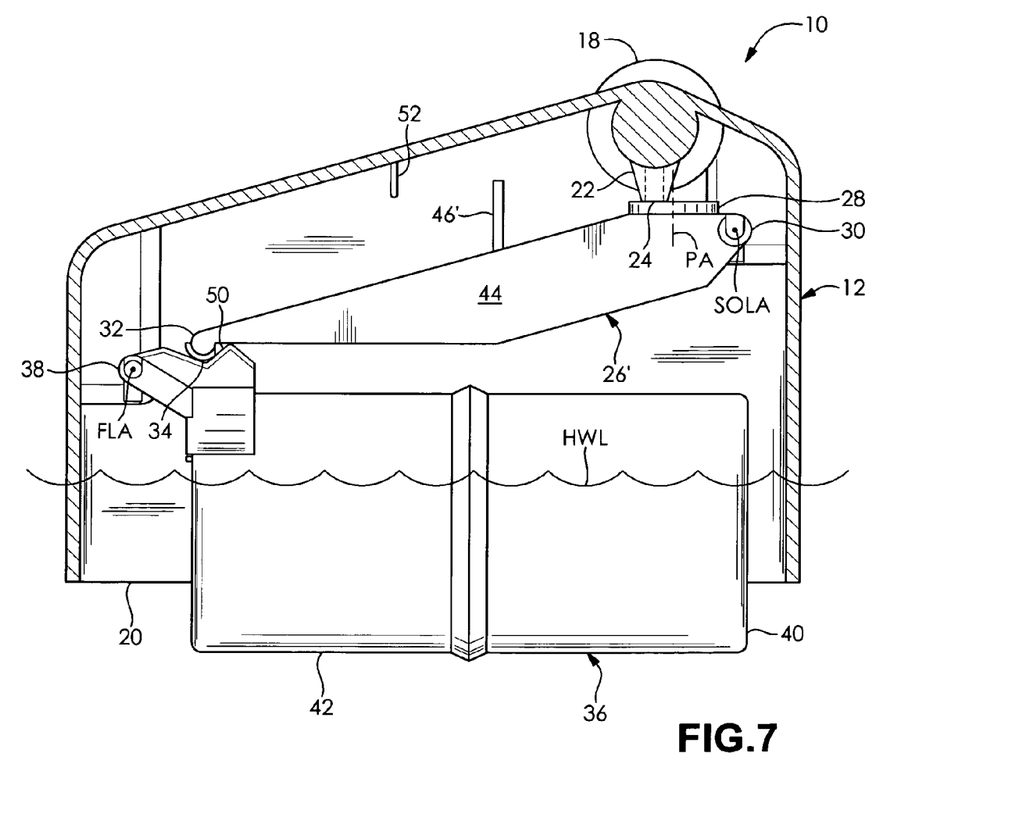
FIG. 7 is a front view of the valve shown in FIGS. 5 and 6 with the valve in a no flow condition.
Figure 8:
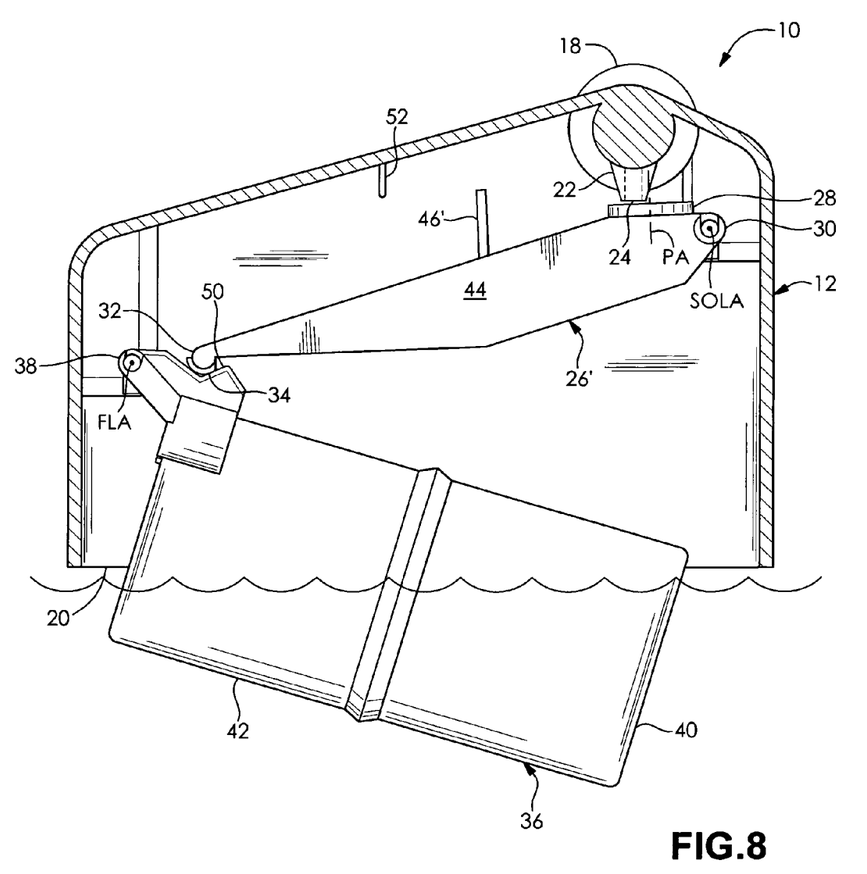
FIG. 8 is a front view of the valve shown in FIGS. 5 through 7 with the valve in a low flow or seeping condition.
Figure 9:
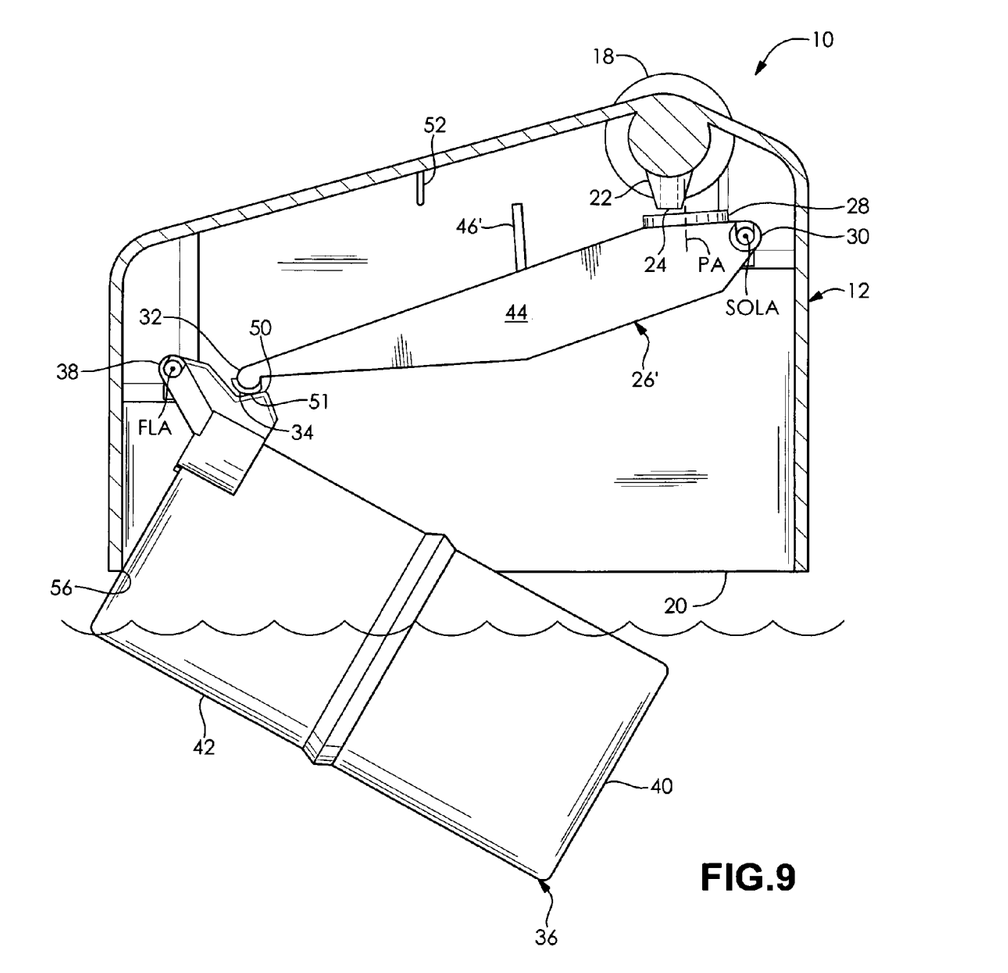
FIG. 9 is a front view of the valve shown in FIGS. 5 through 8 with the valve in a full flow condition.

Turning now to FIGS. 7-9, several operational modes of the valve 10' (which correspond very closely to the operational modes of the valve 10) are described. In FIG. 7, the valve 10 is closed and it is in equilibrium and it will remain so, so long as the draining rate is and remains zero. As illustrated, the shut-off lever 26' and the float lever 36 are in their first shut-off positions and the valve 10' is closed—water is not flowing to and through the outlet nozzle 22. The filling rate is zero. The level of the water is the high water level HWL which is illustrated qualitatively but not quantitatively. In this state, the pressure head of the water in the nozzle 22 exerts a valve opening force on the shut-off pad 28 biasing the shut-off lever 26' towards its open position. This force is transmitted along the length of the shut-off lever 26' to the cam member 34 and it is transmitted to the float lever 36 through a float lever cam member 50 which biases the float lever towards the second, open position. This opening force will be referred to as the closed valve shut-off pad opening force. When the valve 10' is in equilibrium in the closed state illustrated in FIG. 7, the opening force is less than a closing force that is generated through the buoyancy of the float 42 which acts on the float lever 36 biasing it towards the first shut-off position which, in turn, acts on the shut-off lever 26' through the cams 34 and 50, biasing the shut-off lever 26 towards the first closed position.

The cam members 34 and 50 have a variable contact point 51. That is to say, in FIG. 7, the contact point 51 is closest to the float lever axis FLA while, in FIG. 9, the contact point 51 is furthest from the float lever axis FLA. Thus, as the shut-off lever 26 pivots downwardly about the shut-off lever axis SOLA, the opening forces are magnified because they are acting over a longer and longer lever arm. The cam member 36 may have an elliptical cam surface so that the lever arm for the opening forces are magnified still further as the shut-off lever 26 pivots downwardly towards the second open position.

When the valve 10' is in the full closed position shown in FIG. 7 and the draining rate rises above zero, there comes a point where the opening force exceeds the closing force and the valve 10' assumes a position not unlike the position illustrated in FIG. 8. The float lever 36 is in a third, intermediate seeping position and the filling rate is positive but it is very, very low. As the float lever 36 approaches the second, full open position shown in FIG. 9, the filling rate increases to a maximum flow rate.

In a stock watering tank, a draining rate above zero might be due to evaporation or, more likely, to a head of cattle or several heads of cattle drinking from the tank. In either case, as the water level falls, the buoyancy force acting on the float 42 is reduced and that reduces the closing force associated with the float lever 36. At some point, such as the state illustrated in FIG. 8, the opening force exceeds the closing force and liquid begins to flow through and out of the outlet nozzle 22. When the valve 10' opens and liquid begins to flow through the outlet nozzle 22, the force of water exiting the nozzle 22 and striking the shut-off pad 28 exerts an opening force on the lever 26' and this force is referred to as the open valve shut-off pad opening force. Ignoring, for the time being, the effect of the baffles 46' and 48, the valve 10' will operate like a conventional float valve in a known manner. From the state shown in FIG. 8, one of three things will happen next, depending on the relationship between the filling rate and the draining rate.

(1) If the draining rate is higher than the filling rate, the valve 10' will open further moving from the state shown in FIG. 8 towards the full open state shown in FIG. 9; or (2) If the draining rate matches the filling rate, the valve 10' will be in equilibrium and it will remain in the state shown in FIG. 8; or (3) If the draining rate is less than the filling rate, the valve 10' will begin to close moving from the state shown in FIG. 8 towards the closed state, which is when the shut-off lever is just about the position shown in FIG. 7.

When the valve 10' is closing as in (3), above, the filling rate will decrease as the valve 10' gets closer to the closed state and it will begin seeping. As previously mentioned, there are some problems with the seeping condition. When the baffles 46' and 48 are taken into account, however, it will be seen from the description below that the baffles can prevent in some circumstances the valve 10' from operating in a seeping condition.

The baffles 46, 46' and 48 introduce a second opening force into the equation. When the valve 10' is open and water flows through the nozzle 22 in a generally axial direction, it strikes the shut-off sealing pad 28 and it is redirected to flow in a generally radial direction, outwardly from the point or area where the water strikes the sealing pad 28. A portion of the redirected water flow will strike one or more of the baffles and exert a force on the baffle(s). Thus, the shut-off pad serves as a liquid flow directing or redirecting member. It will be appreciated from a cursory glance at the geometry of the valves 10 and 10' that this baffle force is an opening force. The baffle force, when present, biases the shut-off lever 26 to pivot towards the second, full open position shown in FIG. 4 which, in turn, biases the float lever towards its second open position through the cams 34 and 50. The baffle force exists when the valve is open and it is absent when the valve is closed.

When the valves 10 and 10' are open, the portion of the discharge end 24 of the discharge nozzle 22 that is closest to the float lever axis FLA will be further away from the shut-off pad 28 than the portion of the discharge end 24 of the discharge nozzle 22 that is closest to the shut-off lever axis SOLA. Therefore, because of the position of the baffle(s) 46' and 46, over a given period of time, the volume of water that is redirected towards the baffle(s) 46' or 46 is greater than the volume of water that is redirected towards the shut-off lever axis SOLA and greater than the volume of water that is redirected in any other direction. Consequently, the baffle force is greater in the valve 10 and the valve 10' than it would be if the baffle 46' or 46 was positioned in any other axial direction relative to the shut-off pad 28.

The baffle 46' has a larger surface area than the baffle 46. Generally speaking, a larger baffle force will be generated in a case where a larger baffle is used than in a case where a smaller baffle is used. However, the principle is the same in either case. Nonetheless, it is shown that the structure of a valve can be controlled to control the magnitude of the open valve baffle force that biases the shut-off lever 26 to pivot towards the second, full open position shown.

The effect of the baffle is now described with reference to FIGS. 7-9. In order for the state of the valve 10' to change from closed (FIG. 7) to partially open (FIG. 8), the sum of the opening forces has to exceed the sum of the closing forces. As already mentioned, the float 42 is the source of the closing force. As liquid is removed from the associated tank, the closing force arising from the buoyancy of the float will decrease until the closed valve shut-off pad opening force exceeds the float lever closing force and the valve 10' will open. As the valve opens and water flows through the nozzle 22, the closed valve shut-off pad opening force changes to the open valve shut-off pad opening force. As the flow increases, the redirected water flow initiates the baffle opening force. These forces combine to bias the valve towards the open position and the sum of these opening forces is greater than the opening force in conventional float valves. As a consequence, the valve 10' will move towards the open position more rapidly than a conventional float valve, other factors being equal.

In a case where the valve 10' is fully open or nearly so, and the water level is rising, the opening forces will maintain the shut-off lever and the float lever in the FIG. 9 open position against a very substantial float closing force. When the opening forces are finally overcome, the closing force will be very large—so large that the shut-off lever 26' and float lever 36 will move rapidly to their full closed positions shown in FIG. 7. In this situation, the seeping condition will be bypassed completely.

In the stock watering tank application, the draining rate can be very high. Although the numbers vary somewhat, the literature reports that a single cow will drink anywhere from 3 to 8 gallons in a single minute. So, even a small number of head of cattle drinking at the same time can draw the water level in a stock tank down substantially and quickly. In this application, the float arm 36 is more likely to reach its second open position than in some other applications where the draining rate is consistently lower. This makes the stock watering tank application one that will benefit substantially from a valve according to the present invention. When the baffle opening force in valve 10' is taken into account, the float arm 36 is even more likely to reach the second open position than in a valve without a baffle.

It may be noted that whenever the water level is at or below the water level illustrated in FIG. 9, the valve 10 or the valve 10' will be fully open and the opening forces will be at a maximum. Therefore, in order for the valve to close, the closing force has to be great enough to snap the valve into the closed position shown in FIG. 7. Whenever the valve 10 or 10' is in the fully closed position, the valve will remain closed until the float lever 36 moves from the FIG. 7 position to the FIG. 8 third, intermediate seeping position, with liquid seeping through the outlet nozzle 22. In this way, whenever the valve 10 or 10' is in the fully closed position, a substantial volume of water can drain from the tank without any seeping. Once the valve begins to open, and water flows into the tank, water will begin seeping into the tank. If the float lever 36 does not reach a position where the closing forces cause it to snap back into the FIG. 7 position as the tank is filling, water will seep in to the tank and continue to seep into the tank until the valve 10 or 10' closes, i.e., just about at the position shown in FIG. 8, or until the draining rate increases until the valve opens further.

It may be noted that the shut-off pad 28 is mounted relative to the nozzle 22 so that the portion of the pad 28 that actually closes the nozzle 22 is a portion that is situated between the center of the shut-off pad and the circumference of the pad. The pad 28 may be mounted for rotation about a shut-off pad axis PA so that, as the working portion of the pad 28 is worn down, the pad 28 may be rotated to expose a fresh working portion.

A baffle 52 extends downwardly from the interior of the housing and it is positioned between the inlet nozzle 22 and a relief hole 54. When the level of water rises above the open bottom of the housing 12, the interior of the housing would pressurize except that the relief hole 54 prevents that. The baffle 52 is provided to deflect redirected water so that it does not reach the relief hole 54.

When the float lever 36 reaches the second, full open position shown in FIG. 9, the float 42 engages a portion 56 of the housing 12. The portion 56 acts as a float stop and it prevents the float lever 36 from moving downwardly further than the FIG. 9, second, full open position.

Thus, a new float valve is specifically described so as to enable one skilled in the art to make and use the invention, as required by law. In order to understand the true breadth and scope of the invention, however, reference should be made to the appended claims construed in light of the foregoing description.

I claim:

1. A valve comprising
a housing having an interior, an open bottom and a liquid inlet,
a shut-off lever supported in said housing for pivotal movement about a first axis between a first closed position, a second open position and a third seeping position, said shut-off lever having a cam surface,
a closure supported on said shut-off lever and operable, when said shut-off lever is in the first closed position or between the first position and the third position, to prevent liquid from flowing through said liquid inlet,
a baffle supported on said shut-off lever and operable, when struck by liquid flowing through said liquid inlet, to bias said shut-off lever to pivot towards said second open position, and
a float lever supported in said housing for pivotal movement about a second axis between a first, upper, closed position, a second, lower, open position and a third seeping position, said float lever having a cam surface,
wherein said float lever cam surface cooperates with said shut-off lever cam surface so that pivotal movement of said float lever from said second position to said third position causes pivotal movement of said shut-off lever from said second position to said third position.

2. The valve claimed in claim 1 wherein said float lever cam surface cooperates with said shut-off lever cam surface so that pivotal movement of said float lever from said third position to said first position causes pivotal movement of said shut-off lever from said third position to said first position.

3. The valve claimed in claim 1 wherein said float lever is biased to pivot towards said second open position when said shut-off lever is biased to pivot towards said second open position.

4. The valve claimed in claim 3 wherein co-action between said shut-off lever cam and said float lever cam causes said float lever to be biased to pivot towards said second open position when said shut-off lever is biased to pivot towards said second open position.

5. The valve claimed in claim 1 wherein said closure is operable to redirect at least a portion of liquid flowing through said liquid inlet so that it strikes said baffle.

6. A valve comprising
a housing having an interior, an open bottom and a liquid inlet,
a shut-off lever supported in said housing for pivotal movement about a first axis between a first closed position, a second open position and a third seeping position, said shut-off lever having a cam surface,
a closure supported on said shut-off lever and operable, when said shut-off lever is in the first closed position or is between the first position and the third position, to prevent liquid from flowing through said liquid inlet,
a float lever supported in said housing for pivotal movement about a second axis between a first, upper, closed position, a second, lower, open position and a third seeping position, said float lever having a cam surface,
a baffle supported on shut-off lever and when struck by liquid flowing through said liquid inlet, to bias said shut-off lever to pivot towards said second open position, and
a buoyant float supported on said float lever and operable, when acted on by liquid in a container on which the valve is mounted, to bias said float lever towards said first closed position,
wherein said float lever cam surface cooperates with said shut-off lever cam surface so that pivotal movement of said float lever from said second position to said third position biases said shut-off lever for pivotal movement from said second position to said third position and
wherein said float lever cam surface cooperates with said shut-off lever cam surface so that pivotal movement of said float lever from said third position to said first position biases said shut-off lever for pivotal movement from said third position to said first position.

7. The valve claimed in claim 6 which is capable of operating so that the sum of forces biasing said shut-off lever towards said second position can exceed the sum of the forces biasing said float lever towards said first position to such an extent that buoyancy forces biasing said float lever towards said first position are overcome and said float lever is pivoted to said second position and is held there until buoyancy forces exceed the forces biasing said shut-off lever towards said second position to such an extent that said float lever pivots rapidly from said second position to said first position.

8. The valve claimed in claim 6 wherein said baffle is operable, when struck by liquid flowing through said liquid inlet, to exert an opening force on said shut-off lever biasing it to pivot towards said second open position.

9. The valve claimed in claim 6 wherein said float lever is biased to pivot towards said second open position when said shut-off lever is biased to pivot towards said second open position.

10. The valve claimed in claim 6 wherein said shut-off lever is biased to pivot towards said first position when said float lever is biased to pivot towards said first position.

11. The valve claimed in claim 9 wherein co-action between said shut-off lever cam and said float lever cam causes said float lever to be biased to pivot towards said second open position when said shut-off lever is biased to pivot towards said second open position.

12. The valve claimed in claim 9 wherein co-action between said shut-off lever cam and said float lever cam causes said shut-off lever to be biased to pivot towards said first position when said float lever is biased to pivot towards said first position.

13. The valve claimed in claim 8 wherein said closure is operable to redirect at least a portion of liquid flowing through said liquid inlet so that it strikes said baffle.

14. A valve comprising
  a housing having an interior, an open bottom and a liquid inlet,
  a shut-off lever supported in said housing for pivotal movement about a first axis between a first closed position, a second open position and a third seeping position, said shut-off lever having a cam surface,
  a closure supported on said shut-off lever and operable, when said shut-off lever is in the first closed position or is between the first position and the third position, to prevent liquid from flowing through said liquid inlet, said closure being supported on said shut-off lever between said first axis and said shut-off lever cam surface,
  a baffle supported on said shut-off lever and operable, when struck by liquid flowing through said liquid inlet, to bias said shut-off lever to pivot towards said second open position,
  a float lever supported in said housing for pivotal movement about a second axis between a first, upper, closed position, a second, lower, open position and a third seeping position, said float lever having a cam surface, said float lever cam surface being positioned on said float lever so that it is between said second axis and said first axis when said float lever is in the first position, and
  a buoyant float supported on said float lever and operable, when acted on by liquid in a container on which the valve is mounted, to bias said float lever towards said first closed position.

15. The valve claimed in claim 14 wherein said float lever cam surface cooperates with said shut-off lever cam surface so that pivotal movement of said float lever from said second position to said third position biases said shut-off lever for pivotal movement from said second position to said third position.

16. The valve claimed in claim 14 wherein said float lever cam surface cooperates with said shut-off lever cam surface so that pivotal movement of said float lever from said third position to said first position biases said shut-off lever for pivotal movement from said third position to said first position.

17. The valve claimed in claim 14 wherein said baffle is operable, when struck by liquid flowing through said liquid inlet, to exert an opening force on said shut-off lever biasing it to pivot towards said second open position.

18. The valve claimed in claim 17 wherein said closure is operable to redirect at least a portion of liquid flowing through said liquid inlet so that it strikes said baffle.

* * * * *